(12) United States Patent
Fujie et al.

(10) Patent No.: US 7,565,488 B2
(45) Date of Patent: Jul. 21, 2009

(54) APPARATUS, SYSTEM, AND METHOD FOR INTEGRATED BLADE RAID CONTROLLER AND STORAGE

(75) Inventors: Yoshihiro Fujie, Fujisawa (JP); Shah Mohammad Rezaul Islam, Tucson, AZ (US); Gregg Steven Lucas, Tucson, AZ (US); Koji Nakase, Kanagawa (JP); Ronald Dean Parrish, Tucson, AZ (US); Tohru Sumiyoshi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 11/460,166

(22) Filed: Jul. 26, 2006

(65) Prior Publication Data

US 2008/0126715 A1  May 29, 2008

(51) Int. Cl.
  *G06F 12/00* (2006.01)
(52) U.S. Cl. .................. 711/114; 711/115; 711/162; 711/170
(58) Field of Classification Search ................. None
  See application file for complete search history.

(56) References Cited

U.S. PATENT DOCUMENTS

| | | | |
|---|---|---|---|
| 6,895,480 B2 | 5/2005 | Heil | 711/153 |
| 7,093,069 B2 * | 8/2006 | Chong, Jr. | 711/114 |
| 7,249,277 B2 * | 7/2007 | Arai et al. | 714/6 |
| 2002/0194412 A1 * | 12/2002 | Bottom | 710/302 |
| 2004/0064638 A1 * | 4/2004 | Chong, Jr. | 711/114 |
| 2004/0199699 A1 | 10/2004 | Bobbitt et al. | 710/305 |
| 2005/0010709 A1 | 1/2005 | Davies et al. | 710/305 |
| 2005/0223279 A1 | 10/2005 | Malpani et al. | 714/17 |
| 2006/0004782 A1 | 1/2006 | Eldar | 707/100 |
| 2006/0265449 A1 * | 11/2006 | Uemura et al. | 709/203 |
| 2007/0094531 A1 * | 4/2007 | Ni et al. | 714/4 |

OTHER PUBLICATIONS

Dell, Dell Powderedge 1655 MC Blade Server, www.dell.com.

* cited by examiner

*Primary Examiner*—Jack A Lane
(74) *Attorney, Agent, or Firm*—Kunzler & McKenzie (57) ABSTRACT

An apparatus, system, and method are disclosed for integrating a blade RAID controller and storage. A storage blade enclosure communicates with a blade chassis. The storage blade enclosure is mounted within the blade chassis. A RAID controller disposed in the storage blade enclosure receives a command through the storage blade enclosure. In one embodiment, the command is communicated through the blade chassis from a processor blade mounted in the blade chassis. The RAID controller redundantly stores data to or retrieves data from a storage module disposed in the storage blade enclosure in response to the command using a RAID redundancy methodology.

20 Claims, 7 Drawing Sheets

(Prior Art)

APPARATUS, SYSTEM, AND METHOD FOR INTEGRATED BLADE RAID CONTROLLER AND STORAGE

BACKGROUND OF THE INVENTION

1. Field of the Invention

This invention relates to integrating storage and more particularly relates to integrating a redundant array of independent disk (RAID) controller and storage in a storage blade enclosure.

2. Description of the Related Art

Data processing systems are increasingly employing blade systems to deploy multiple processors. A blade system typically includes a blade chassis that mounts a plurality of processor blades. Each processor blade is in communication with the blade chassis. Each processor blade may include one or more processors, memory, communications logic, and the like that enable the processor blade to perform computing functions as is well known to those skilled in the art.

Integrating computing functions into a processor blade may reduce the cost and administrative overhead of running a data processing system. Processor blades in the blade chassis can easily be replaced. For example, a first processor blade may be replaced by removing the first processor blade from the blade chassis and by mounting a second processor blade in the blade chassis. In addition, adding processor blades to an enclosure can quickly add computing capacity to a data processing system.

Like discrete servers, processor blades often require access to one or more storage subsystems. A processor blade may store and retrieve large amounts of data on the storage subsystems. In addition, the processor blade may share data with other processor blades through the storage subsystems. For example, a storage subsystem may store a database. A plurality of processor blades may access the database, reading data from the database and writing data to the database. The database may employ data locks on accessed data within the database to maintain coherent data.

Unfortunately, storage subsystems are not as easily managed as processor blades. For example, a storage subsystem may require communications channels from the blade chassis to a storage area network ("SAN"), communications channels between the SAN and the storage controllers, and additional communications channels between the storage controllers and the storage devices. Configuring and maintaining the communications channels requires additional administrative overhead, increasing the time required to add storage elements and make replacements. The administrative overhead is particularly significant for RAID systems, which include a plurality of storage devices.

From the foregoing discussion, it should be apparent that a need exists for an apparatus, system, and method that integrate a RAID controller and storage in a blade. Beneficially, such an apparatus, system, and method would reduce the costs of providing RAID storage for processor blades in a blade system while minimizing the number of blade slots required to achieve the aforementioned integrated Storage Subsystem(s).

SUMMARY OF THE INVENTION

The present invention has been developed in response to the present state of the art, and in particular, in response to the problems and needs in the art that have not yet been fully solved by currently available methods of providing RAID data storage to blade systems. Accordingly, the present invention has been developed to provide an apparatus, system, and method for integrating a RAID controller and storage in a blade that overcome many or all of the above-discussed shortcomings in the art.

The apparatus to integrate a RAID controller and storage in a blade is provided with a plurality of modules configured to functionally execute the steps of communicating with a blade chassis from a storage blade enclosure, receiving a command through the storage blade enclosure, and redundantly storing data to or retrieving data from a storage module in response to the command. These modules in the described embodiments include a storage blade enclosure, a storage module, and a RAID controller.

The storage blade enclosure mounts within a blade chassis. In addition, the storage blade enclosure communicates with the blade chassis through an interface such as a digital electronic interface, an optical interface, or the like.

The storage module is disposed within the storage blade enclosure. In one embodiment, the storage module comprises a plurality of storage devices. The storage devices may be disposed in one or more replaceable storage trays. In a certain embodiment, the storage devices are hard disk drives. Alternatively, the storage devices may be optical storage devices, micromechanical storage devices, tape drives and semiconductor storage devices.

The RAID controller is also disposed within the storage blade enclosure. In addition, the RAID controller is in communication with the storage module and the storage blade enclosure. The RAID controller is configured to store data to or retrieve data from the storage module in response to a command. For example, the RAID controller may receive the command from a processor blade through the blade chassis and storage blade enclosure to store data to the storage module.

The RAID controller stores and retrieves data using a RAID redundancy methodology. The RAID redundancy methodology may be a RAID 0, RAID 1, RAID 0+1, RAID 5, or RAID 6 RAID redundancy methodology. The apparatus integrates the RAID controller and the storage module in the storage blade enclosure, allowing RAID storage to be easily added to, administered within, and removed from the blade chassis.

A system of the present invention is also presented to integrate RAID controllers and storage in a blade. The system may be embodied in a blade system. In particular, the system, in one embodiment, includes a blade chassis, a plurality of processor blades, and a storage blade.

The blade chassis may mount a plurality of blades that conform to specified physical dimensions, include specified mounting hardware, and include specified interfaces for communicating data, supplying electric power, and the like. For example, each blade may have a specified height and depth, and a width that is an integer multiple of a specified width. Each blade may also connect to a power coupling and an airflow coupling for receiving electric power and cooling airflow respectively. In addition, each blade may exchange digital communications with the blade chassis through one or more interfaces such as a digital electronic interface, an optical interface, or the like.

The plurality of processor blades mounts within the blade chassis and may perform computational functions. The storage blade includes a storage blade enclosure that mounts within the blade chassis. The storage blade also includes a storage module and a plurality of redundant RAID controllers that are disposed within the storage blade enclosure.

The storage module includes a plurality of replaceable storage trays. Each storage tray includes a plurality of storage devices. The storage devices may be hard disk drives.

The RAID controllers communicate with the blade chassis through the storage blade enclosure and communicate with the storage module. In addition, the RAID controllers store data to and retrieve data from the storage module for the plurality of processor blades in response to a command received through the storage blade enclosure. The RAID controllers store and retrieve the data using a RAID redundancy methodology. The system integrates the RAID controllers and storage in the storage blade, easing administration of RAID storage for the blade system.

A method of the present invention is also presented for integrating a RAID controller and storage in a blade. The method in the disclosed embodiments substantially includes the steps to carry out the functions presented above with respect to the operation of the described apparatus and system. In one embodiment, the method includes communicating with a blade chassis from a storage blade enclosure, receiving a command through the storage blade enclosure, and redundantly storing data to or retrieving data from a storage module in response to a command.

A storage blade enclosure communicates with a blade chassis. The storage blade enclosure is mounted within the blade chassis. A RAID controller disposed within the storage blade enclosure receives a command through the storage blade enclosure. In one embodiment, the command is communicated through the blade chassis from a processor blade mounted within the blade chassis. The RAID controller redundantly stores data to or retrieves data from a storage module disposed in the storage blade enclosure in response to the command using a RAID redundancy methodology. The method integrates the RAID controller and storage module in a storage module enclosure mounted with the blade chassis, providing integrated data storage and retrieval for processor blades mounted in the blade chassis.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention integrates a RAID controller and RAID storage within a blade mounted within a blade chassis. In addition, the embodiment of the present invention allows a plurality of processor blades to store data to and retrieve data from the RAID storage using a RAID redundancy methodology. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. In addition, a module may include structural and interface elements, such as mounting hardware, connections for data buses, and the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
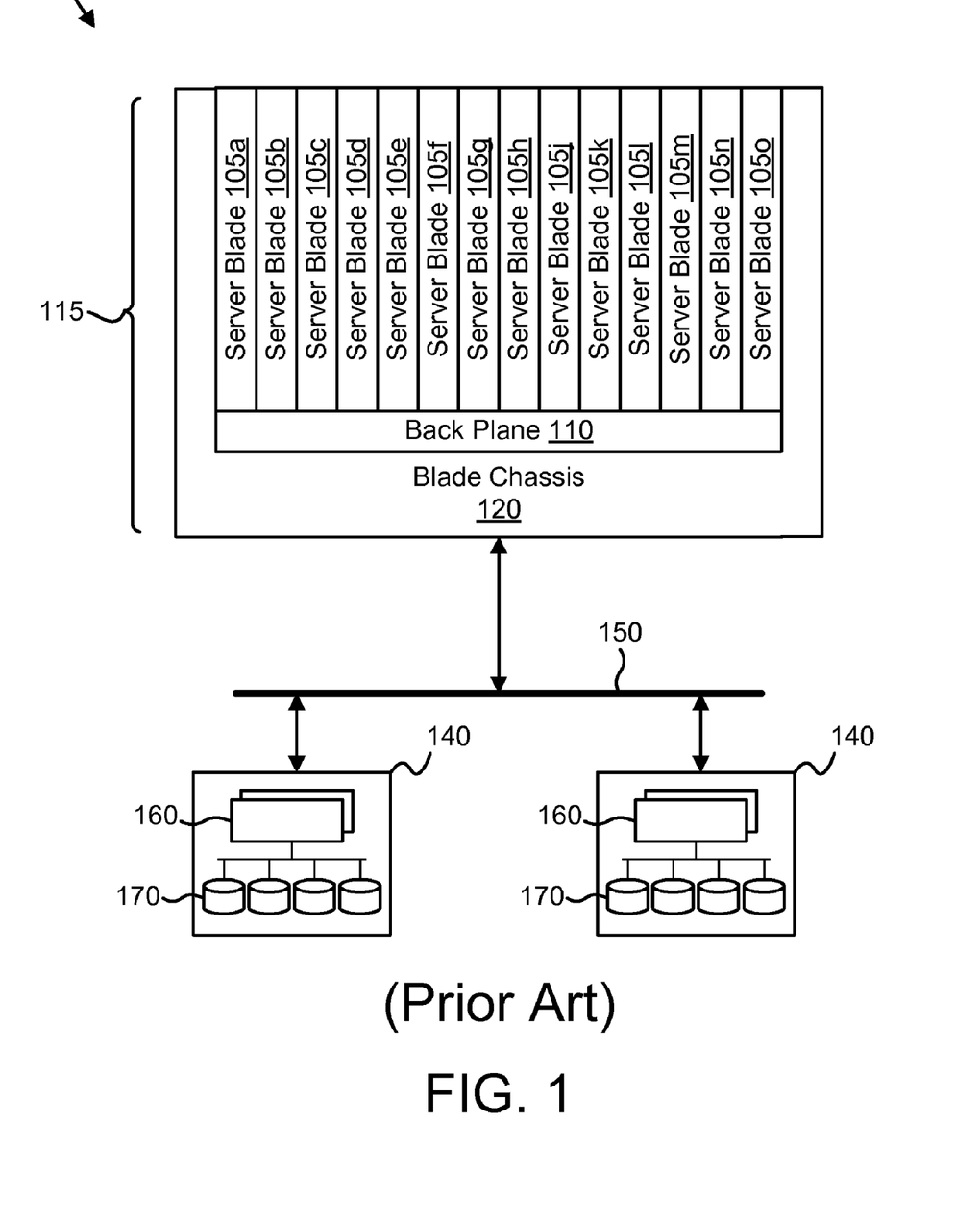
FIG. 1 is a schematic block diagram illustrating one embodiment of a data processing system.

FIG. 1 is a schematic block diagram illustrating one embodiment of a data processing system 100. The system 100 includes a blade system 115, a storage network 150, and one or more storage subsystems 140. The blade system 115 includes a blade chassis 120, one or more processor blades 105, and a back plane 110.

In one embodiment, the blade chassis 120 is configured as an enclosure comprising the back plane 110. The blade chassis 120 receives the processor blades 105, connecting the processor blades 105 to the back plane 110. In one embodiment, the back plane 110 is configured as one or more non-blocking switches.

The blade chassis 120 includes one or more slots as will be shown hereafter. A slot may include one or more interfaces such as data bus connectors, power couplings, air flow couplings, and the like for connecting a processor blade 105 to the blade chassis 120. In one embodiment, a plurality of slots may mount one device such as a processor blade 105. The slot may also include mounting hardware for retaining a mounted device as is well known to those skilled in the art.

The storage subsystems 140 may each include one or more storage controllers 160 and one or more storage devices 170. The storage subsystems 140 may store and retrieve data for the processor blades 105 as is well known to those skilled in the art.

Each processor blade 105 may include one or more processors, one or more memory modules, and interface logic as is well known to those skilled in the art. The interface logic may communicate with the back plane 110. Each processor blade 105 may execute one or more software processes. In a prophetic example, a first processor blade 105a may execute an accounting program while a second, third, and fourth processor blade 105b, 105c, 105d execute a transactional database program.

An administrator may easily replace a failed processor blade 105. In a prophetic example, if the first processor blade 105a fails, the administrator may transfer tasks of the first server blade 105a to a second processor blade 105b, remove the first processor blade 105a from the blade chassis, and mount a replacement processor blade 105 within the blade chassis 120 in a slot of the first processor blade 105a.

The administrator may easily add processor blades 105 to vacant slots within blade system 115 to increase the processing capacity of the blade system 115. In one embodiment, processor blades 105 may be hot-swapped or dismounted and mounted from the blade chassis 120 while the blade system 115 is operational.

The processor blades 105 may also by configured with local storage devices such as hard disk drives. In addition, the processor blades 105 will typically store significant data on the storage devices 170 of the storage subsystems 140. The processor blades 105 may store data to and retrieve data from the storage devices 170 by communicating with the storage controllers 160. In one embodiment, the storage network 150 and storage subsystems 140 are configured as a storage area network ("SAN").

The storage controllers 160 may be configured as RAID storage controllers 160. The storage controllers 160 may manage the redundant storage of data across one or more storage devices 170, such that if a storage device 170 fails, the stored data may be received from the remaining storage devices 170 as is well known to those skilled in the art. The storage devices 170 may be configured as hard disk drives, micromechanical storage devices, semiconductor storage devices, optical storage devices, or the like.

Unfortunately, the storage subsystems 140 are not as easily managed as the processor blades 105. The storage subsystems 140 must be connected between the processor blades 105 and the storage network 150 by data cables. In addition, storage devices 170 and storage controllers 160 of the storage subsystems 140 may require further interconnections with data cables. The storage subsystems 140 may also require unique management software, further increases the costs and difficulties of managing the external storage subsystems 140

The embodiment of the present invention supports integrating a RAID controller and storage within a blade of the blade system 115 as will be described hereafter. The integrated RAID storage may be maintained by mounting and dismounting the RAID storage within the blade system 115, supporting less costly maintenance and administration of data storage for the blade system 115.

Figure 2:
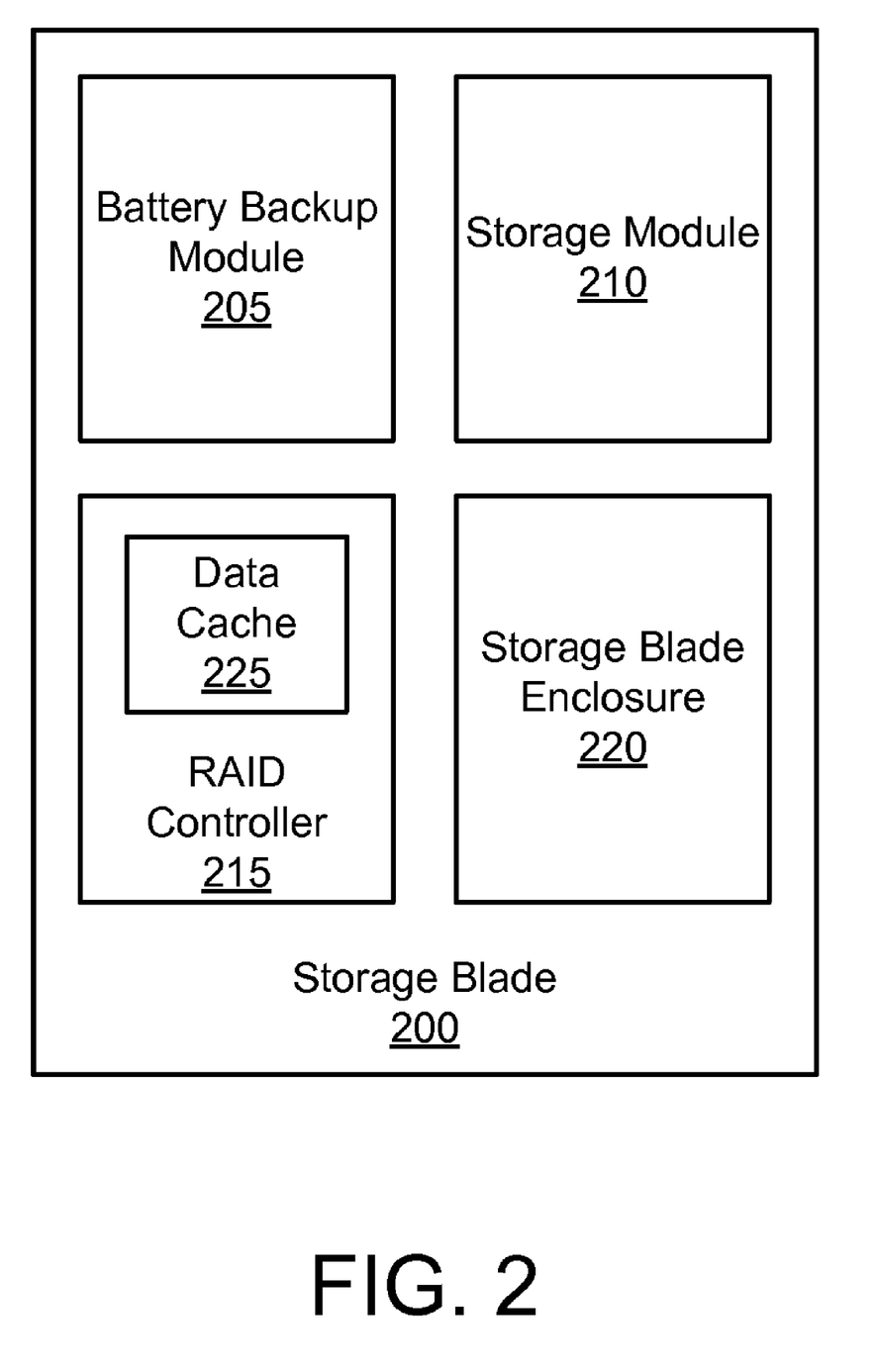
FIG. 2 is a schematic block diagram illustrating one embodiment of a storage blade of the present invention.

FIG. 2 is a schematic block diagram illustrating one embodiment of a storage blade 200 of the present invention. The storage blade 200 includes a battery backup module 205, storage module 210, RAID controller 215, and storage blade enclosure 220. The description of the storage blade 200 refers to elements of FIG. 1, like numbers referring to like elements.

The storage blade enclosure 220 mounts within the blade chassis 120. In addition, the storage blade enclosure 220 communicates with the blade chassis 120 through an interface such as a digital electronic interface, an optical interface, or the like. The interface may connect to the back plane 110 through one or more connectors.

The storage module 210 is disposed within the storage blade enclosure 220. In one embodiment, the storage module 210 comprises a plurality of storage devices. The storage devices may be disposed in one or more replaceable storage trays as will be described hereafter. In a certain embodiment, the storage devices are hard disk drives. Alternatively, the storage devices may be optical storage devices, micromechanical storage devices, and semiconductor storage devices.

The RAID controller 215 is also disposed within the storage blade enclosure 220. In addition, the RAID controller 215 is in communication with the storage module 210 and the storage blade enclosure 220. The RAID controller 215 is configured to store data to or retrieve data from the storage module 210 in response to a command. For example, the RAID controller 215 may receive the command from a processor blade 105 through the blade chassis 120 and storage blade enclosure 220 to store data to the storage module 210.

The RAID controller 215 stores and retrieves data using a RAID redundancy methodology. The RAID redundancy methodology may be a RAID 0, RAID 1, RAID 0+1, RAID 5, or RAID 6 RAID redundancy methodology.

The RAID 0 redundancy methodology stripes data across a plurality of storage devices. The RAID 1 redundancy methodology mirrors data from a first storage device to a second storage device. The RAID 0+1 redundancy mirrors striped data of the first storage device to the second storage device. The RAID 5 redundancy methodology stripes data with redundant parity stripes sufficient to recover the data if any one storage device fails. The RAID 6 redundancy methodology stripes data with redundant parity stripes sufficient to recover the data if any two storage devices fail.

The RAID controller 215 may include a data cache 225. The data cache 225 may cache data from the storage module 210. The data cache 225 may provide more rapid access to storage module data by the processor blades 105 as is well known to those of skill in the art.

The battery backup module 205 may comprise a battery and power control logic configured to supply electric power at a specified voltage of alternating current and/or direct current power within a specified current range if a primary power source fails. The battery backup module 205 may be configured to provide the power to the RAID controller 215, the storage module 210, and/or data cache 225, with the primary power source providing power to the battery backup module 205. In a certain embodiment, the battery backup module 205 provides power only to the data cache 225.

The storage blade 200 integrates the RAID controller 215 and the storage module 210 in the storage blade enclosure 220, allowing RAID control and storage to be easily added to, administered, and removed from the blade chassis 120 of the blade system 115.

Figure 3:
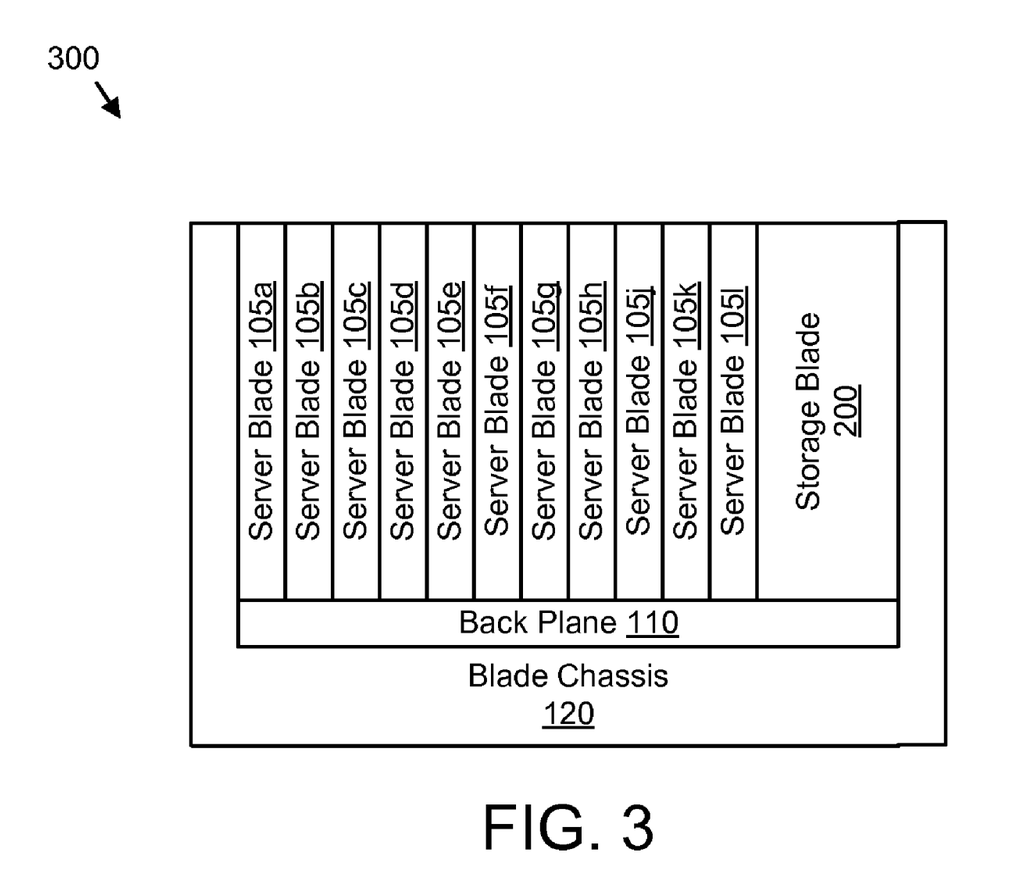
FIG. 3 is a schematic block diagram illustrating one embodiment of a blade system of the present invention.

FIG. 3 is a schematic block diagram illustrating one embodiment of a blade system 300 of the present invention. The description of the system 300 refers to elements of FIGS. 1-2, like numbers referring to like elements.

The storage blade 200 is shown mounted in three slots of the blade chassis 120. Although the storage blade 200 is shown mounted in three slots, the storage blade 200 may be mounted in any number of slots.

The processor blades 105 mounted in the blade chassis 120 may store data to and retrieve data from the storage module 210 of the storage blade 200 through the RAID controller 215. An external storage subsystem 140 as shown in FIG. 1 may not be required.

Figure 4:
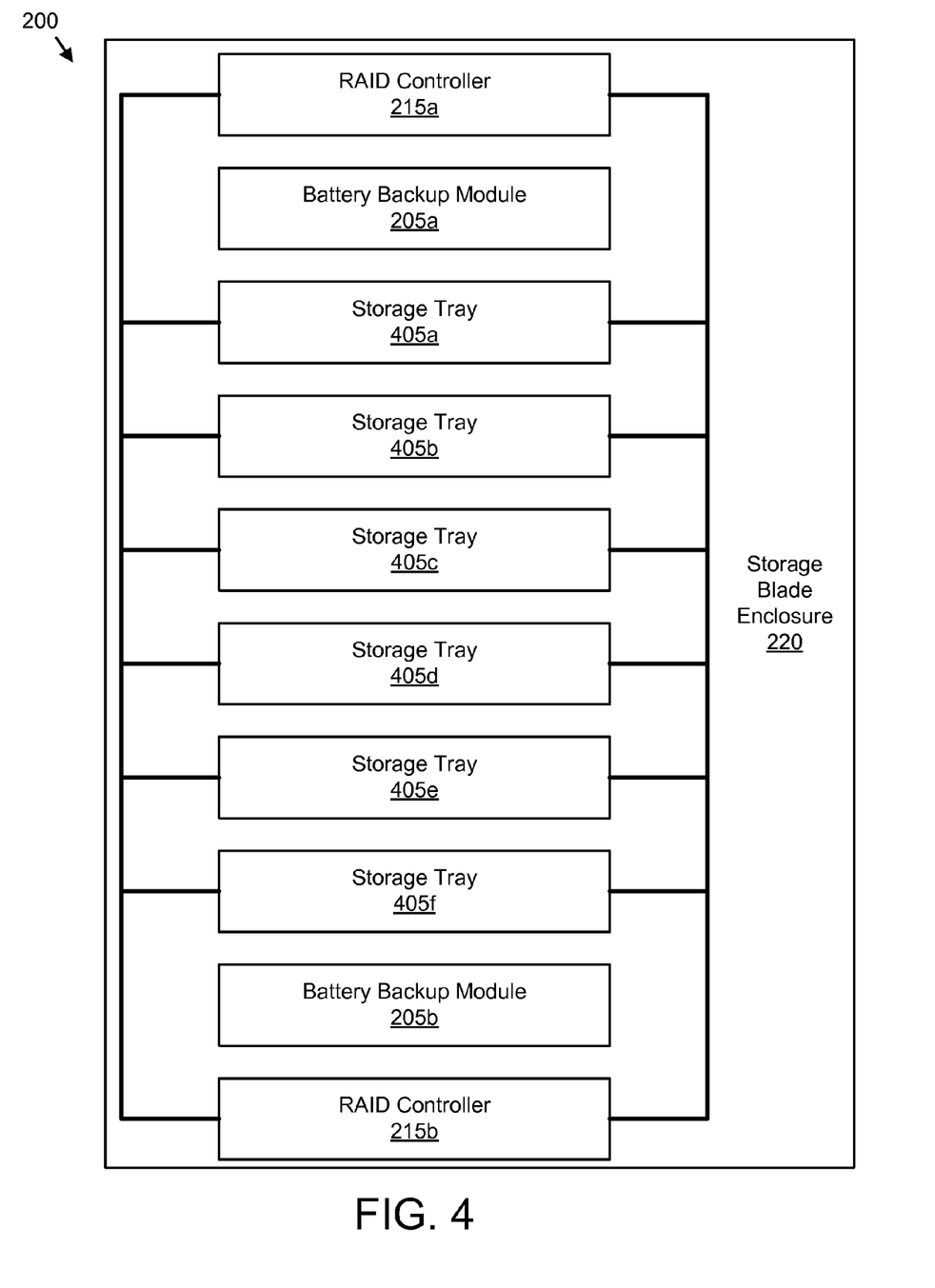
FIG. 4 is a schematic block diagram illustrating one alternate embodiment of a storage blade of the present invention.

In prophetic example, if the administrator determines that the system 300 requires additional RAID storage, the administrator may remove three processor blades 105 from the blade chassis 120 and mount a second storage blade (not shown). In addition, if any part of the storage blade 200 such as RAID controller 215 and/or the storage module 210 failed, the administrator may easily replace the storage blade 200 with the second storage blade so that the processor blades 105 may continue to have access to RAID storage FIG. 4 is a schematic block diagram illustrating one alternate embodiment of a storage blade 200 of the present invention. The description of the storage blade 200 refers to elements of FIGS. 1-3, like numbers referring to like elements. The storage blade 200 shows two RAID controllers 215, two battery backup modules 205, and six storage trays 405 disposed in the storage blade enclosure 220. Although two RAID controllers 215, two battery backup modules 205, and six storage trays 405 are depicted, any number of RAID controllers 215, battery backup modules 205, and storage trays 405 may be employed.

The storage trays 405 embody the storage module 210. Each storage tray 405 may include one or more storage devices as will be described hereafter. Each RAID controller 215 may store data to and retrieve data from each storage tray 405.

In one embodiment, the RAID controllers 215 are configured as redundant devices. That is, a first RAID controller 215a may perform all the functions of a second RAID controller 215b and the second RAID controller 215b may perform all the functions of the first RAID controller 215a. In a prophetic example, the first RAID controller 215a may fail. However, a processor blade 105 may still be able to store data to and retrieve data from any storage tray 405 through the second RAID controller 215b.

In one embodiment, each storage tray 405 may be individually removed from the storage blade enclosure 220. In a prophetic example, the first RAID controller 215a may receive an indication that a first storage tray 405a may fail. The indication may be that one or more storage devices of the first storage tray 405a has an increased access latency, is responding to access commands at a reduced rate, or the like. The first RAID controller 215 may communicate a warning through the storage blade enclosure 220 and the storage chassis 120 to the administrator. One or more software processes such as a firmware process executing on the first RAID controller 215a may direct the first RAID controller 215a and/or the second RAID controller 215b to migrate data from the first storage tray 205a. The administrator may further remove the first storage tray 405a and mount a replacement storage tray 405 in the place of the first storage tray 405a. The first RAID controller 215a and/or second RAID controller 215b may initialize the replacement storage tray 405 and redundantly store data to the replacement storage tray 405.

Figure 5:
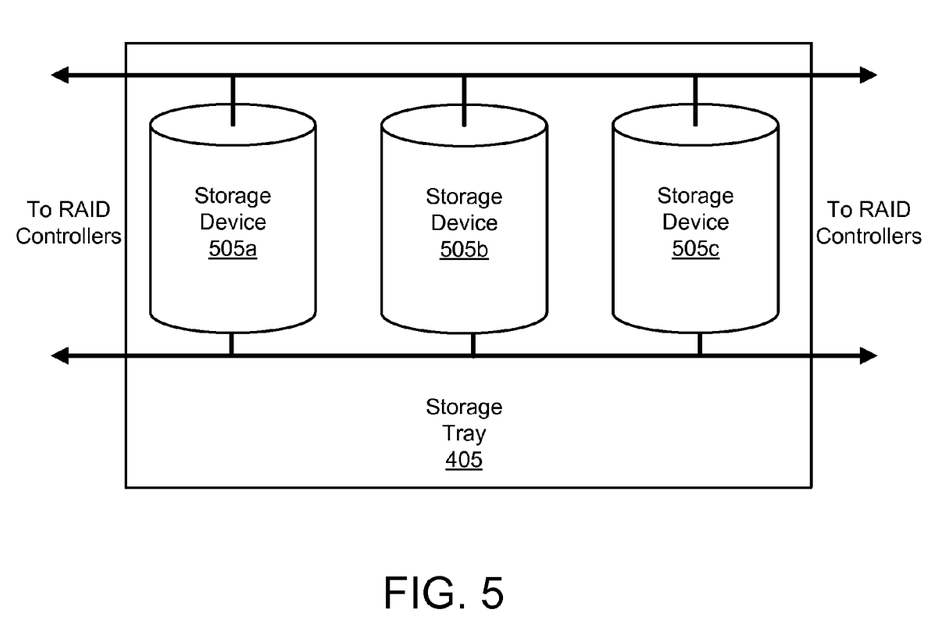
FIG. 5 is a schematic block diagram illustrating one embodiment of a storage tray of the present invention.

FIG. 5 is a schematic block diagram illustrating one embodiment of a storage tray 405 of the present invention. The description of the storage tray 405 refers to elements of FIGS. 1-4, like numbers referring to like elements. As depicted the storage tray 405 includes three storage devices 505. However, the storage tray 405 may employ any number of storage devices 505.

In one embodiment, the storage devices 505 are configured as hard disk drives. Alternatively, the storage devices 505 may be optical storage devices, micromechanical storage devices, semiconductor storage devices, or the like. In a certain embodiment, each storage device 505 may employ a unique storage technology. In a prophetic example, a first storage device 505a may be a hard disk drive while a second storage device 505b may be an optical storage device and a third storage device 505c may be a micromechanical storage device.

Figure 6:
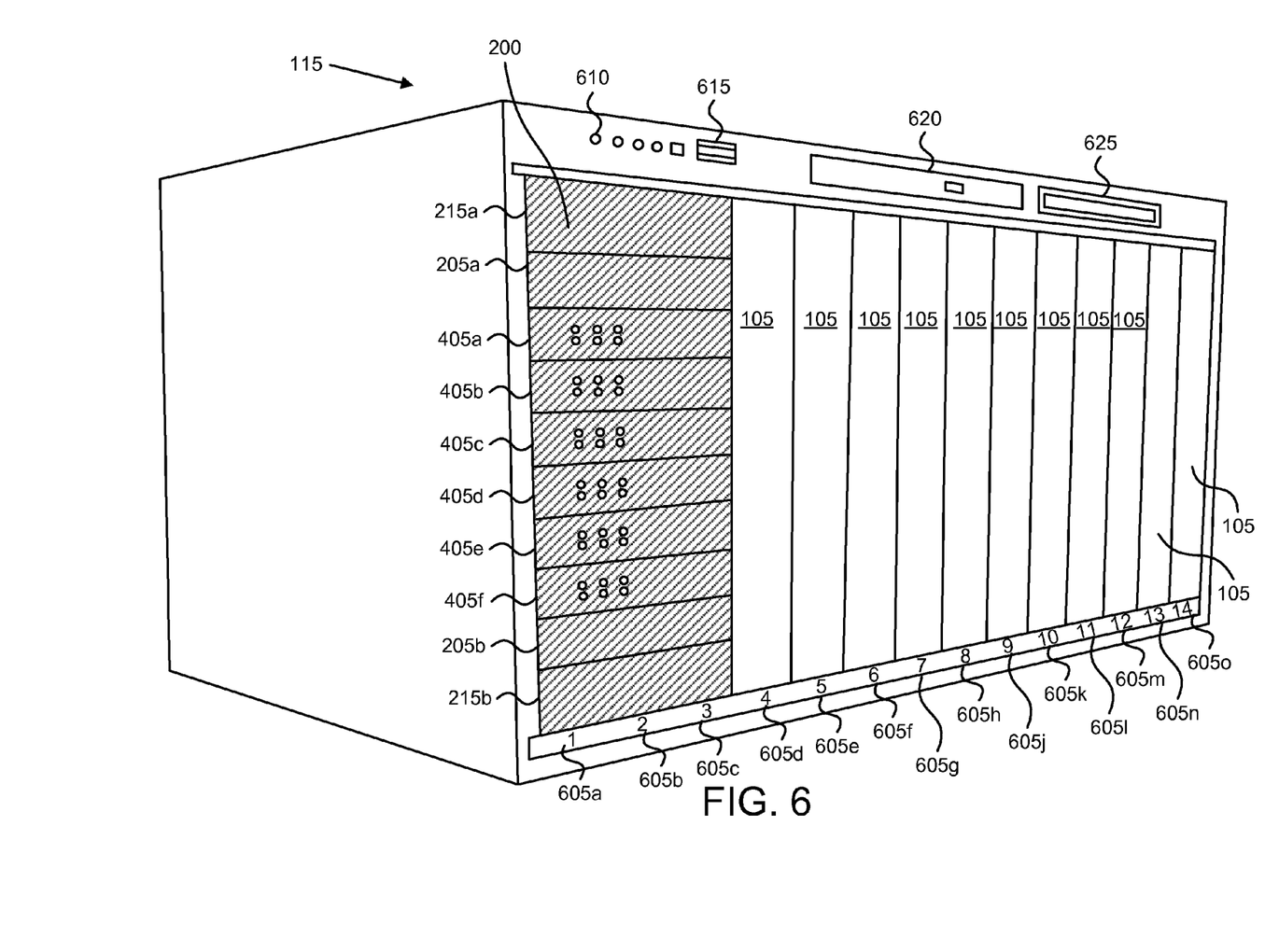
FIG. 6 is a perspective drawing illustrating one embodiment of a blade system of the present invention.

FIG. 6 depicts a perspective view illustrating one embodiment of a blade system 115 of the present invention. Note that the blade system 115 shown is not to scale, but is intended to demonstrate possible physical relationships between blade components. The blade system 115 may be similar to a BladeCenter manufactured by International Business Machines Corporation of Armonk, N.Y. and/or a BladeSystem manufactured by Hewlett Packard Corporation of Palo Alto, Calif. The description of the blade system 115 refers to elements of FIGS. 1-5, like numbers referring to like elements.

The blade system 115 includes, in one embodiment, fourteen (14) slots 605. A first, second, and third slot 605a, 605b, 605c are occupied by the storage blade 200 as indicated by the cross hatching. A fourth through fourteenth slots 605d-o are filled with processor blades 105. The blade system 115 typically is rack mounted but may also be a standalone device. Rack mounting hardware is not shown.

The processor blades 105 and storage blade 200 mount in the blade system 115 by sliding into the slots 605. In addition to processor blades and storage blades 200, other types of blades such as communication interface blades may mount in the slots 605. The blades 105, 200 typically connect to power couplings and interface buses. The interface buses may be used for data transfer, blade management, blade monitoring, and the like. The blades 105, 200 may also be connected with cables to other devices.

The blade system 115 may also include one or more indicator lights and/or buttons 610. The blade system 115 is also shown with one or more universal serial bus connections 615. The blade system 115 may also include other connections such as a serial port, parallel port, FireWire®, wireless connection, etc. The blade system 115 may also include devices for removable storage media such as a compact disk drive 620 and/or a Zip® drive 625. In addition, the blade system 115 may also include other removable storage media such as tape drives, optical drives, floppy drives, etc. The blade system 115 may also include other user interface and management controls, indicators, and equipment. One of skill in the art will recognize other controls, indicators, connections, removable storage media, and equipment suitable for a blade system 115.

The processor blades 105 are advantageous because of their compact size, reliability, and ease of administration, replacement, upgrade, and addition. Adding the storage blade 200 to a blade system 115, extending the advantages of size and ease of administration to storage subsystems. The storage blade 200 also provides a convenient system-in-a-box solution for small businesses or others that may desire a blade system 115 with processor blades 105 mounted in only some of the slots 605. The storage blade 200 in the blade system 115 may also be desirable for larger computer systems where users want to conserve space and/or reduce cabling.

The RAID controllers 215, battery backup modules 205, and storage trays 405 are disposed within the storage blade enclosure 220 of the storage blade 200, although the storage blade enclosure 220 is hidden in the current view. In one embodiment, the RAID controllers 215, battery backup modules 205, and storage trays 405 are individually replaceable from the storage blade enclosure 220. In a certain embodiment, the RAID controllers 215, battery backup modules 205, and storage trays 405 are individually hot swappable.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
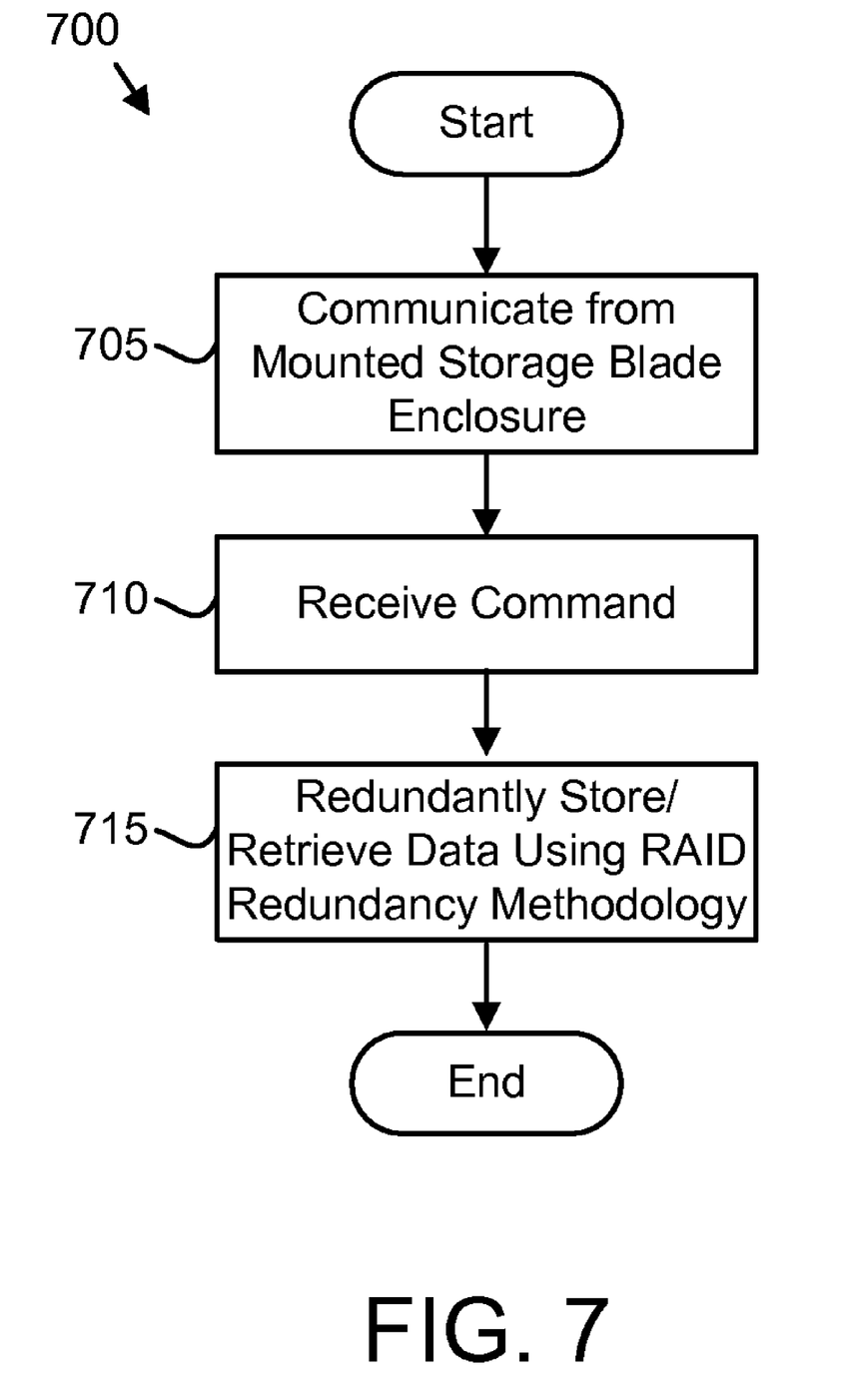
FIG. 7 is a schematic flow chart diagram illustrating one embodiment of a RAID integration method in accordance with the present invention.

FIG. 7 is a schematic flow chart diagram illustrating one embodiment of a RAID integration method 700 in accordance with the present invention. The method 700 substantially includes the steps to carry out the functions presented above with respect to the operation of the described apparatus 200, 400 and system 300, 500, 600 of FIGS. 1-6. The description of the method 700 refers to elements of FIGS. 1-6, like numbers referring to like elements.

The storage blade enclosure 220 communicates 705 with a blade chassis 120. In one embodiment, the storage blade enclosure 220 may communicate 705 through one or more interfaces such as a digital data bus interface or the like. The storage blade enclosure 220 is mounted within the blade chassis 120 and may communicate with the blade chassis 120 through a back plane 110 of the blade chassis 120. The back plane 110 may be configured as one or more non-blocking switches configured to support communications between any two or more devices that communication with the blade chassis 120.

The RAID controller 215 disposed within the storage blade enclosure 220 receives 710 a command through the storage blade enclosure 220. In one embodiment, the command is communicated through the blade chassis 120 from a processor blade 105 mounted in the blade chassis 120.

The command may be a write command and include a plurality of data bytes. The write command may direct the RAID controller 215 to store the data bytes to the storage module 210. Alternatively, the command may be a read command and direct the RAID controller 215 to retrieve a plurality of data bytes from the storage module 210. The storage module 210 is disposed within the storage blade enclosure 220 and communicates with the RAID controller 215.

The RAID controller 215 redundantly stores data to or retrieves 715 data from the storage module 210 in response to the command using a RAID redundancy methodology. In a prophetic example, the RAID controller 215 may employ a RAID 1 RAID redundancy methodology and store 715 data to both a first storage device 505a and a second storage device 505b of the first storage tray 405a.

In an alternate prophetic example, the RAID controller 215 may store 715 the data using the RAID 1 RAID redundancy methodology by storing 715 the data to the first storage device 505a of the first storage tray 405a and storing 715 or mirroring the data to a third storage device 405b of a second storage tray 405b. The method 700 integrates the RAID controller 215 and storage module 210 in the storage blade enclosure 220 mounted with the blade chassis 120, providing integrated data storage and retrieval for processor blades 105 mounted in the blade chassis 120.

The embodiment of the present invention integrates a RAID controller 215 and storage module 210 within a storage blade 200 and allows a plurality of processor blades 105 to store data to and retrieve data from the storage blade 200 using a RAID redundancy methodology. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to integrate a redundant array of independent disks (RAID) controller and storage in a blade, the apparatus comprising:

a storage blade enclosure configured to mount within a blade chassis and communicate with the blade chassis;

a storage module disposed within the storage blade enclosure and comprising a plurality of storage trays that are individually removable from the storage module, each storage tray comprising at least one storage device; and a RAID controller disposed within the storage blade enclosure, in communication with the storage module and the storage blade enclosure, and configured to store data to or retrieve data from the storage module in response to a command using a RAID redundancy methodology, wherein the data is stored or retrieved for a plurality of processor blades in communication with the blade chassis and mounted within the blade chassis, and the command is received through the storage blade enclosure.

2. The apparatus of claim 1, wherein the RAID controller is configured as a plurality of redundant RAID controllers.

3. The apparatus of claim 1, wherein the storage module comprises a plurality of replaceable storage trays and each storage tray comprises a plurality of storage devices.

4. The apparatus of claim 3, wherein the storage devices are configured as hard disk drives.

5. The apparatus of claim 1, wherein the RAID controller further comprises a data cache configured to cache data and wherein the apparatus comprises a battery backup module configured to provide power to the data cache in response to a power failure.

6. The apparatus of claim 1, wherein the RAID redundancy methodology is selected from RAID 0, RAID 1, RAID 0+1, RAID 5, and RAID 6 RAID redundancy methodologies.

7. The apparatus of claim 1, wherein the storage module is configured as run-time shared storage.

8. The apparatus of claim 1, wherein the RAID controller receives an indication that a first storage try is failing and communicates a warning to the blade chassis.

9. The apparatus of claim 1, wherein the storage trays are hot swappable.

10. A computer program product comprising a computer useable medium having a computer readable program, wherein the computer readable program when executed on a computer causes the computer to:
communicate with a blade chassis from a storage blade enclosure configured to mount within the blade chassis;
receive a command through the storage blade enclosure; and
redundantly store data to or retrieve data from a storage module disposed within the storage blade enclosure in response to the command using a RAID controller disposed within the storage blade enclosure implementing a RAID redundancy methodology, wherein the data is stored or retrieved for a plurality of processor blades in communication with the blade chassis and mounted within the blade chassis; and
wherein the storage module comprises a plurality of replaceable storage trays and each storage tray comprises a plurality of storage devices.

11. The computer program product of claim 10, wherein the storage devices are configured as hard disk drives.

12. The computer program product of claim 10, wherein the computer readable program is further configured to cause the computer to direct a battery backup module to provide power to a data cache in response to a power failure.

13. The computer program product of claim 10, wherein the RAID redundancy methodology is selected from RAID 0, RAID 1, RAID 0+1, RAID 5, and RAID 6 RAID redundancy methodologies.

14. The computer program product of claim 10, wherein the storage module is configured as run-time shared storage.

15. A system to integrate RAID controllers and storage in a blade, the system comprising:
a blade chassis;
a plurality of processor blades in communication with the blade chassis and configured to mount within the blade chassis;
a storage blade comprising
a storage blade enclosure configured to mount within the blade chassis and communicate with the blade chassis;
a storage module disposed within the storage blade enclosure and comprising a plurality of replaceable storage trays wherein each storage tray comprises a plurality of hard disk drives; and
a plurality of redundant RAID controllers disposed within the storage blade enclosure, in communication with the storage module and the storage blade enclosure, and configured to store data to or retrieve data from the storage module in response to a command using a RAID redundancy methodology, wherein the data is stored or retrieved for the plurality of processor blades and the command is received through the storage blade enclosure.

16. The system of claim 15, wherein each redundant RAID controller further comprises a data cache configured to cache data.

17. The system of claim 15, wherein the storage blade further comprises a battery backup module configured to provide power to the data cache in response to a power failure.

18. The system of claim 15, wherein the RAID redundancy methodology is selected from RAID 0, RAID 1, RAID 0+1, RAID 5, and RAID 6 RAID redundancy methodologies.

19. A method for deploying computer infrastructure, comprising integrating computer-readable code into a computing system, wherein the code in combination with the computing system is capable of performing the following:
communicating with a blade chassis from a storage blade enclosure configured to mount within the blade chassis;
receiving a command through the storage blade enclosure;
redundantly storing data to or retrieving data from the storage module in response to the command using a RAID redundancy methodology, wherein the data is stored or retrieved for a plurality of processor blades in communication with the blade chassis and mounted within the blade chassis and the storage module comprises a plurality of replaceable storage trays and each storage tray comprises a plurality of storage devices; and
directing a battery backup module to provide power to a data cache in response to a power failure.

20. The method of claim 19, wherein the RAID redundancy methodology is selected from RAID 0, RAID 1, RAID 0+1, RAID 5, and RAID 6 RAID redundancy methodologies.

* * * * *